(12) United States Patent
Wright et al.

(10) Patent No.: US 7,800,470 B2
(45) Date of Patent: Sep. 21, 2010

(54) METHOD AND SYSTEM FOR A LINEAR ACTUATOR WITH STATIONARY VERTICAL MAGNETS AND COILS

(75) Inventors: Andrew M. Wright, Cambridge, MA (US); Christopher Corcoran, Newton, MA (US); David Cope, Medfield, MA (US)

(73) Assignee: Engineering Matters, Inc., Newton Upper Falls, MA (US)

( * ) Notice: Subject to any disclaimer, the term of this patent is extended or adjusted under 35 U.S.C. 154(b) by 142 days.

(21) Appl. No.: 12/029,138

(22) Filed: Feb. 11, 2008

(65) Prior Publication Data

US 2008/0191825 A1 Aug. 14, 2008

Related U.S. Application Data

(60) Provisional application No. 60/889,413, filed on Feb. 12, 2007.

(51) Int. Cl.
*H01F 7/00* (2006.01)
*H01F 1/00* (2006.01)
*H01F 3/00* (2006.01)
*H02K 21/26* (2006.01)
*H02K 21/38* (2006.01)
*H02K 23/04* (2006.01)
*H02K 1/00* (2006.01)
*H02K 3/00* (2006.01)

(52) U.S. Cl. .................. 335/229; 335/296; 335/302; 310/154.01; 310/154.21; 310/154.32; 310/154.43; 310/181

(58) Field of Classification Search .................. 335/229, 335/296, 302; 310/154, 154.01, 154.21, 310/154.32, 154.43, 181
See application file for complete search history.

(56) References Cited

U.S. PATENT DOCUMENTS

| | | | | |
|---|---|---|---|---|
| 3,070,730 A | * | 12/1962 | Gray et al. | 335/229 |
| 3,728,654 A | * | 4/1973 | Tada | 335/234 |
| 4,777,915 A | | 10/1988 | Bonvallet | |
| 4,794,890 A | | 1/1989 | Richeson, Jr. | |
| 5,070,826 A | | 12/1991 | Kawamura | |
| 5,268,662 A | * | 12/1993 | Uetsuhara et al. | 335/229 |
| 5,365,210 A | | 11/1994 | Hines | |
| 5,437,306 A | | 8/1995 | Asou et al. | |
| 5,679,989 A | | 10/1997 | Buscher et al. | |
| 5,887,624 A | | 3/1999 | Taniguchi et al. | |
| 5,896,076 A | * | 4/1999 | van Namen | 335/229 |
| 5,939,963 A | | 8/1999 | Harcombe | |
| 6,476,702 B1 | | 11/2002 | Hartwig et al. | |
| 6,633,157 B1 | | 10/2003 | Yamaki et al. | |
| 6,642,825 B2 | * | 11/2003 | Ohya | 335/229 |
| 6,991,211 B2 | | 1/2006 | Altonji | |

(Continued)

*Primary Examiner*—Elvin G Enad
*Assistant Examiner*—Mohamad A Musleh
(74) *Attorney, Agent, or Firm*—Hayes Soloway PC

(57) ABSTRACT

A linear actuating device contains a top magnet and a bottom magnet. The bottom magnet is axially aligned with the top magnet. The top magnet and the bottom magnet have opposing magnetization. A washer is sandwiched between the top magnet and the bottom magnet. A top coil is positioned within the top magnet. A bottom coil is positioned within the bottom magnet. A slug is slidably positioned within the top coil and bottom coil. An actuating member is integral with the slug.

19 Claims, 5 Drawing Sheets

U.S. PATENT DOCUMENTS

| | | |
|---|---|---|
| 7,517,721 B2 * | 4/2009 | Ito et al. .................. 438/106 |
| 2004/0025949 A1 | 2/2004 | Wygnaski |
| 2004/0111891 A1 | 6/2004 | Braeuer et al. |
| 2004/0113731 A1 * | 6/2004 | Moyer et al. ............. 335/220 |
| 2005/0139796 A1 | 6/2005 | Altonji |
| 2005/0168311 A1 * | 8/2005 | Wright et al. ............ 335/306 |
| 2005/0211938 A1 | 9/2005 | Ryuen et al. |
| 2006/0012454 A1 | 1/2006 | Sano et al. |
| 2006/0082226 A1 * | 4/2006 | Protze ....................... 310/14 |
| 2006/0097830 A1 | 5/2006 | Forsythe et al. |
| 2006/0124880 A1 | 6/2006 | King |
| 2006/0145797 A1 | 7/2006 | Muramatsu et al. |
| 2006/0208842 A1 * | 9/2006 | Maerky et al. ............ 335/302 |
| 2006/0261300 A1 | 11/2006 | Merabet et al. |
| 2006/0278838 A1 | 12/2006 | Chavanne |
| 2007/0034264 A1 | 2/2007 | Kunz et al. |

\* cited by examiner

US 7,800,470 B2

METHOD AND SYSTEM FOR A LINEAR ACTUATOR WITH STATIONARY VERTICAL MAGNETS AND COILS

CROSS-REFERENCE TO RELATED APPLICATION

This application claims priority to copending U.S. Provisional Application entitled, "Method and system for a linear actuator with stationary vertical magnets and coils," having Ser. No. 60/889,413, filed Feb. 12, 2007, which is entirely incorporated herein by reference.

FIELD OF THE INVENTION

The present invention is related to the field of magnetism, and in particular, is related to direct drive actuators employing a radial magnetic field and conducting coil acting on an element of a valve.

BACKGROUND OF THE INVENTION

Actuators are traditionally a mechanical art. Most actuators contain valves, springs, and pivoting elements that move the valves. One of the problems with mechanical actuators is that parts of the mechanical actuators have a tendency to wear down. When the springs become less elastic and the pivoting joints become worn, the valves cease to operate in an efficient manner. An actuator with fewer moving parts would tend to outlast the traditional mechanical actuators.

Recently, a need has developed for actuators that are extremely small. For instance, through rapid advancement in the miniaturization of essential elements such as inertial measurement units, sensors, and power supplies, Micro Air Vehicles (MAVS) have been developed. These MAVs are being designed to be as small as 15 centimeters. Mechanical actuators at such a small size are extremely unwieldy and unreliable.

U.S. Pat. Nos. 6,828,890 and 6,876,284 are directed to magnetically actuated valves and the teachings thereof are incorporated herein by reference, although not all teachings therein are considered prior art for the invention disclosed herein. Also among the prior art are alternative actuators, such as that disclosed in U.S. Pat. No. 4,515,343 to Pischinger.

Thus, a heretofore unaddressed need exists in the industry to address the aforementioned deficiencies and inadequacies.

SUMMARY OF THE INVENTION

Embodiments of the present invention provide a system and method for providing a linear actuator. Briefly described, in architecture, one embodiment of the system, among others, can be implemented as follows. The system contains a top magnet and a bottom magnet. The bottom magnet is axially aligned with the top magnet. The top magnet and the bottom magnet have opposing magnetization. A washer is sandwiched between the top magnet and the bottom magnet. A top coil is positioned within the top magnet. A bottom coil is positioned within the bottom magnet. A slug is slidably positioned within the top coil and bottom coil. An actuating member is integral with the slug.

The present invention can also be viewed as providing methods for providing and utilizing a linear actuator. In this regard, one embodiment of such a method, among others, can be broadly summarized by the following steps: axially aligning a bottom permanent magnet with a top permanent magnet, wherein the top magnet and the bottom magnet have opposing magnetization; sandwiching a washer between the top magnet and the bottom magnet; positioning a top coil within the top magnet and a bottom coil within the bottom magnet; positioning a slug slidably at least partially within the top coil and bottom coil; and energizing at least one coil generating a reluctance force that causes the slug to slide along an axis of the coils.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
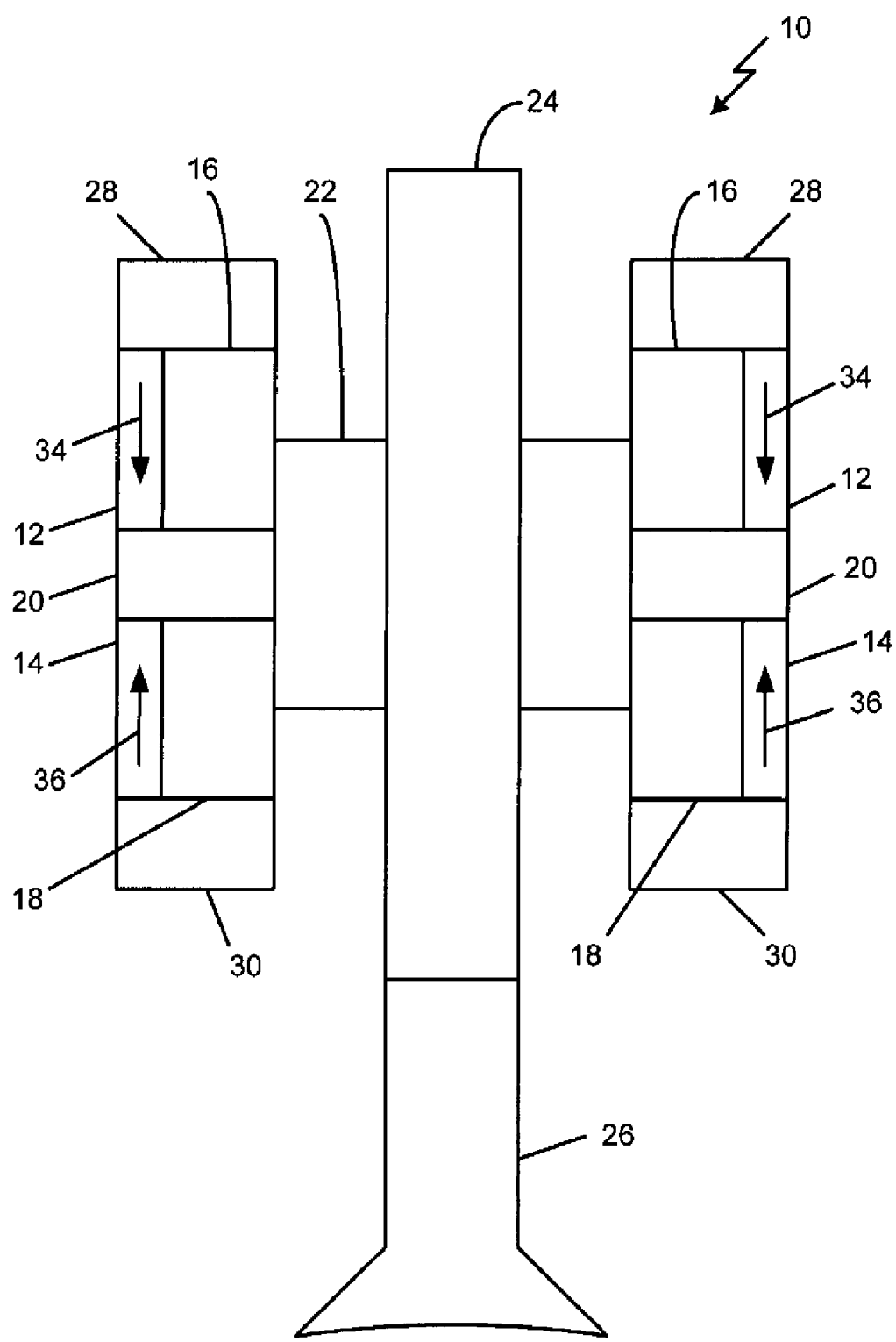
FIG. 1 is a cross-sectional side view of the linear actuator, in accordance with a first exemplary embodiment of the present invention.

FIG. 1 is a cross-sectional side view of a linear actuator 10, in accordance with a first exemplary embodiment of the present invention. The linear actuator 10 is a permanent magnet actuator with a top stationary magnet 12 and a bottom stationary magnet 14. Both the top magnet 12 and the bottom magnet 14 have a substantially cylindrical opening formed therein. A top coil 16 and a bottom coil 18 are at least partially surrounded by the top magnet 12 and the bottom magnet 14, respectively. At least one washer 20 separates the top magnet 12 and the bottom magnet 14 and the top coil 16 and the bottom coil 18. A slug 22 is slidably disposed within the coils 16, 18 and attached to an elongated member 24. The elongated member 24 is attached to an actuating member 26, such as an engine valve.

The linear actuator 10 is a permanent magnet actuator with stationary magnets 12, 14 and coils 16, 18. Only a slug 22 made of a ferromagnetic material moves under the influence of the forces controlled by the excitation of the coils 16, 18. The force exerted on the slug 22 is approximately linearly proportional to the applied current and varies roughly linearly over the stroke. The top magnet 12 and the bottom magnet 14 have opposing vertical magnetization, as shown by the top magnetization 34 and the bottom magnetization 36. The elongated member 24 need not and, preferably, does not influence the magnetic circuit. End caps 28, 30 may be attached to the magnets 12, 14 and help hold the linear actuator 10 together.

Linear actuator 10 performance may be measured as moving mass acceleration divided by the square root of the input electrical power. The mass may include the slug 22, the elongated member 24, and the actuating member 26, although the mass may largely be based upon the engine valve/actuating member 26 (which is manipulated by the linear actuator 10, but is otherwise not utilized in actuation). The slug 22 acceleration is determined principally by the force exerted on the slug 22 relative to the mass. The slug 22 may be exclusively ferromagnetic, which may limit possible forces to a reluctance force. The reluctance force is proportional to the square of the magnetic field on one end of the slug 22 subtracted from the square of the magnetic field at the other end of the slug 22. The two coils 16, 18 are driven independently; one coil (e.g., the top coil 16) may be adjusted to cancel the attractive magnetic field at one end of the slug 22 (so very little magnetic field is squared and subtracted) while the other coil (e.g., the bottom coil 18) is driven with a current intended to develop a magnetic field which attracts the slug 22. This attraction can be precisely controlled in order to minimize the dissipated electrical power over one cycle of engine valve motion. Analyses have shown that a tailored acceleration profile achieves the desired kinematic motion while minimizing power. This power efficiency is a material improvement over alternative actuators.

Figure 2:
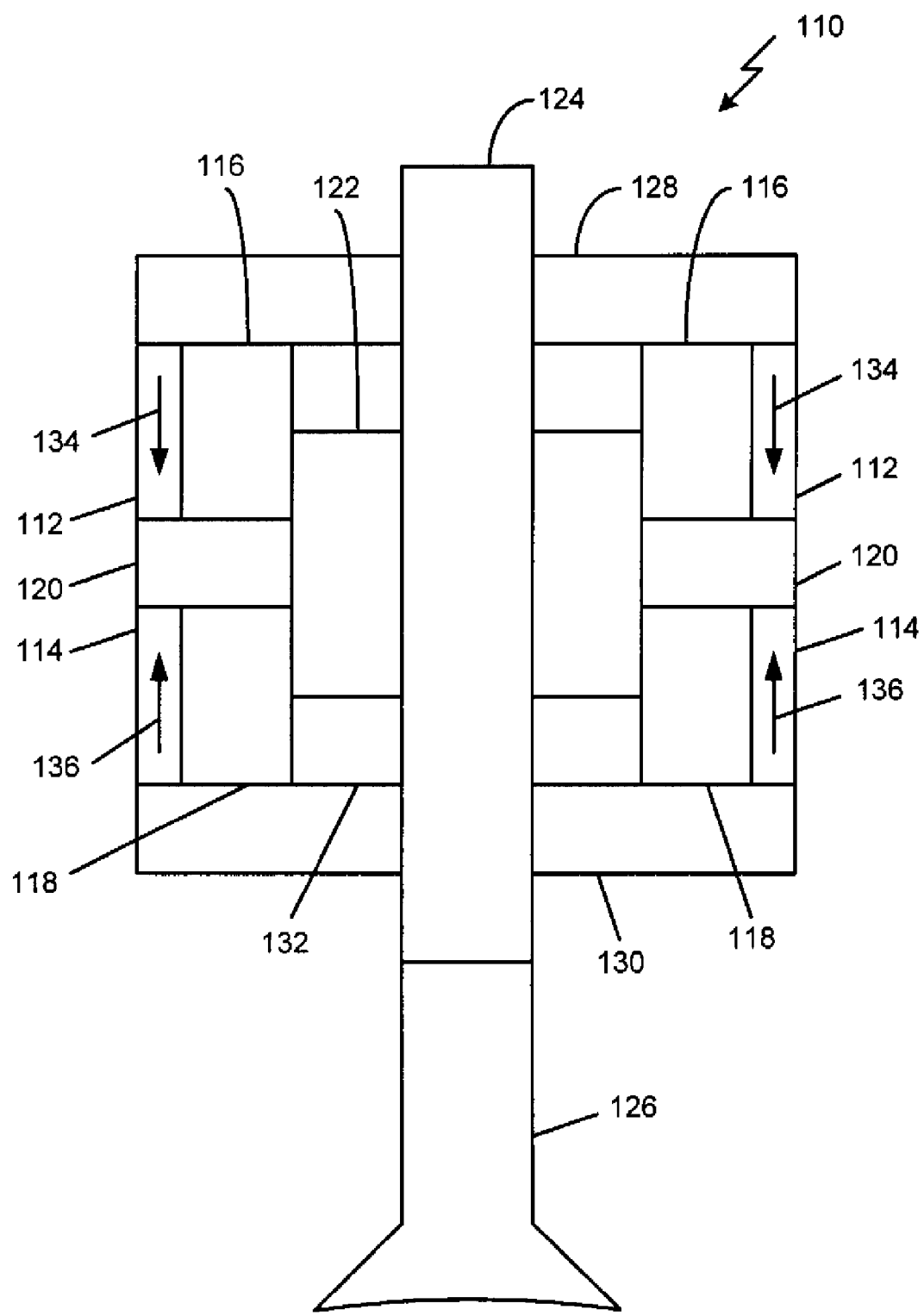
FIG. 2 is a cross-sectional side view of the linear actuator, in accordance with a second exemplary embodiment of the present invention.

FIG. 2 is a cross-sectional side view of a linear actuator 110, in accordance with a second exemplary embodiment of the present invention. The linear actuator 110 is a permanent magnet actuator with a top stationary magnet 112 and a bottom stationary magnet 114. Both the top magnet 112 and the bottom magnet 114 have a substantially cylindrical opening formed therein. A top coil 116 and a bottom coil 118 are at least partially surrounded by the top magnet 112 and the bottom magnet 114, respectively. At least one washer 120 separates the top magnet 112 and the bottom magnet 114 and the top coil 116 and the bottom coil 118. A slug 122 is slidably disposed within the coils 116, 118 and attached to an elongated member 124. The slug 122 is maintained within the coils 116, 118 by a top end cap 128 and a bottom end cap 130. The elongated member 124 is attached to an actuating member 126, such as an engine valve.

The top magnet 112 and the bottom magnet 114 have opposing vertical magnetization, as shown by the top magnetization 134 and the bottom magnetization 136. The stroke of the slug 122 is limited by the end caps 128, 130. The magnets 112, 114 and excited coils 116, 118 provide the magnetomotive force and the washer 120 made of a ferromagnetic material and end caps 128, 130 complete the magnetic circuit. The elongated member 124 need not and, preferably, does not influence the magnetic circuit. An air gap 132 exists between the end caps 128, 130 and within the coils 116, 118. A position of the air gap 132 varies with the position of the slug 122. The total air gap 132 is constant, but the effective air gap 132 does vary significantly over the stroke. Because of the nature of the reluctance forces, the effective air gap 132 is measured from the washer 120 to the highest magnetic field end of the linear actuator 110.

Figure 3:
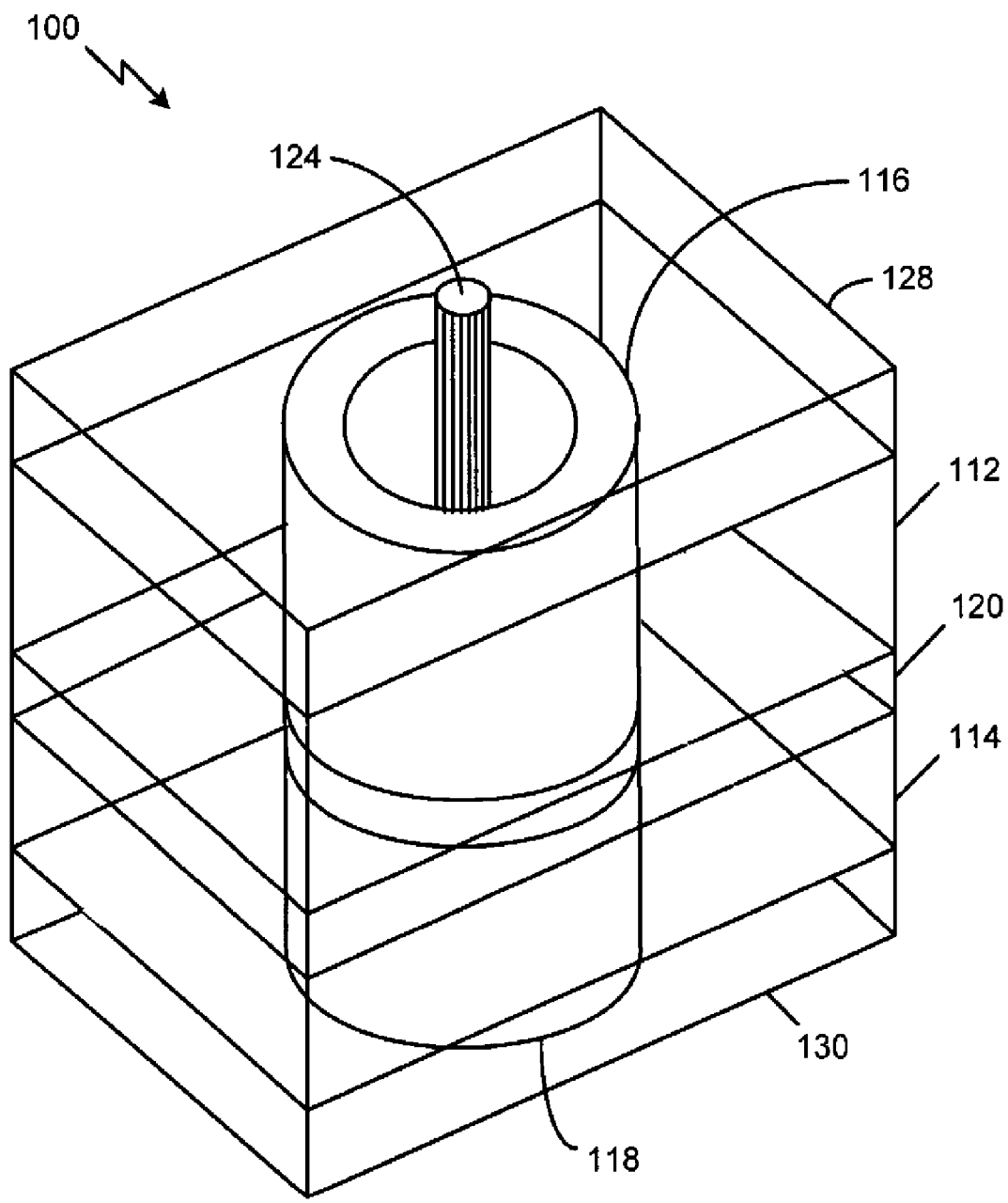
FIG. 3 is a perspective isometric view of a linear actuator of FIG. 2, in accordance with the second exemplary embodiment of the present invention.

FIG. 3 is a perspective isometric view of a linear actuator 110 of FIG. 2, in accordance with the second exemplary embodiment of the present invention. As shown in FIG. 3, the top magnet 112 and the bottom magnet 114 may have a rectangular cross-section with a circular opening there through. The top magnet 112 and the bottom magnet 114 may have a rectangular prism shape. Producing permanent magnets having rectangular prism shapes may be more cost effective than producing cylindrical permanent magnets. The top magnet 112 and the bottom magnet 114 may be similarly shaped.

Linear actuator 110 performance may be measured as moving mass acceleration divided by the square root of the input electrical power. The mass may include the slug 122, the elongated member 124, and the actuating member 126, although the mass may largely be based upon the engine valve/actuating member 126 (which is manipulated by the linear actuator 110, but is otherwise not utilized in actuation). The slug 122 acceleration is determined principally by the force exerted on the slug 122 relative to the mass. The slug 122 may be exclusively ferromagnetic, which may limit possible forces to a reluctance force. The reluctance force is proportional to the square of the magnetic field on one end of the slug 122 subtracted from the square of the magnetic field at the other end of the slug 122. The two coils 116, 118 are driven independently; one coil (e.g., the top coil 116) may be adjusted to cancel the attractive magnetic field at one end of the slug 122 (so very little magnetic field is squared and subtracted) while the other coil (e.g., the bottom coil 118) is driven with a current intended to develop a magnetic field which attracts the slug 122. This attraction can be precisely controlled in order to minimize the dissipated electrical power over one cycle of engine valve motion. Analyses have shown that a tailored acceleration profile achieves the desired kinematic motion while minimizing power. This power efficiency is a material improvement over alternative actuators.

As mentioned above, the actuating member 126 may be an engine valve. Engine valves are known to be moved through mechanical forces. Actuating an engine valve, or a plurality of engine valves, through reluctance force may reduce engine wear. To make the linear actuator 110 more accessible for an engine, the linear actuator 110 has been designed with an overall shape of a rectangular prism. As engines tend to operate with a series of engine valves, having a series of linear actuators 110 with rectangular cross-sections may allow a plurality of linear actuators 110 to be bundled more effectively.

Figure 4:
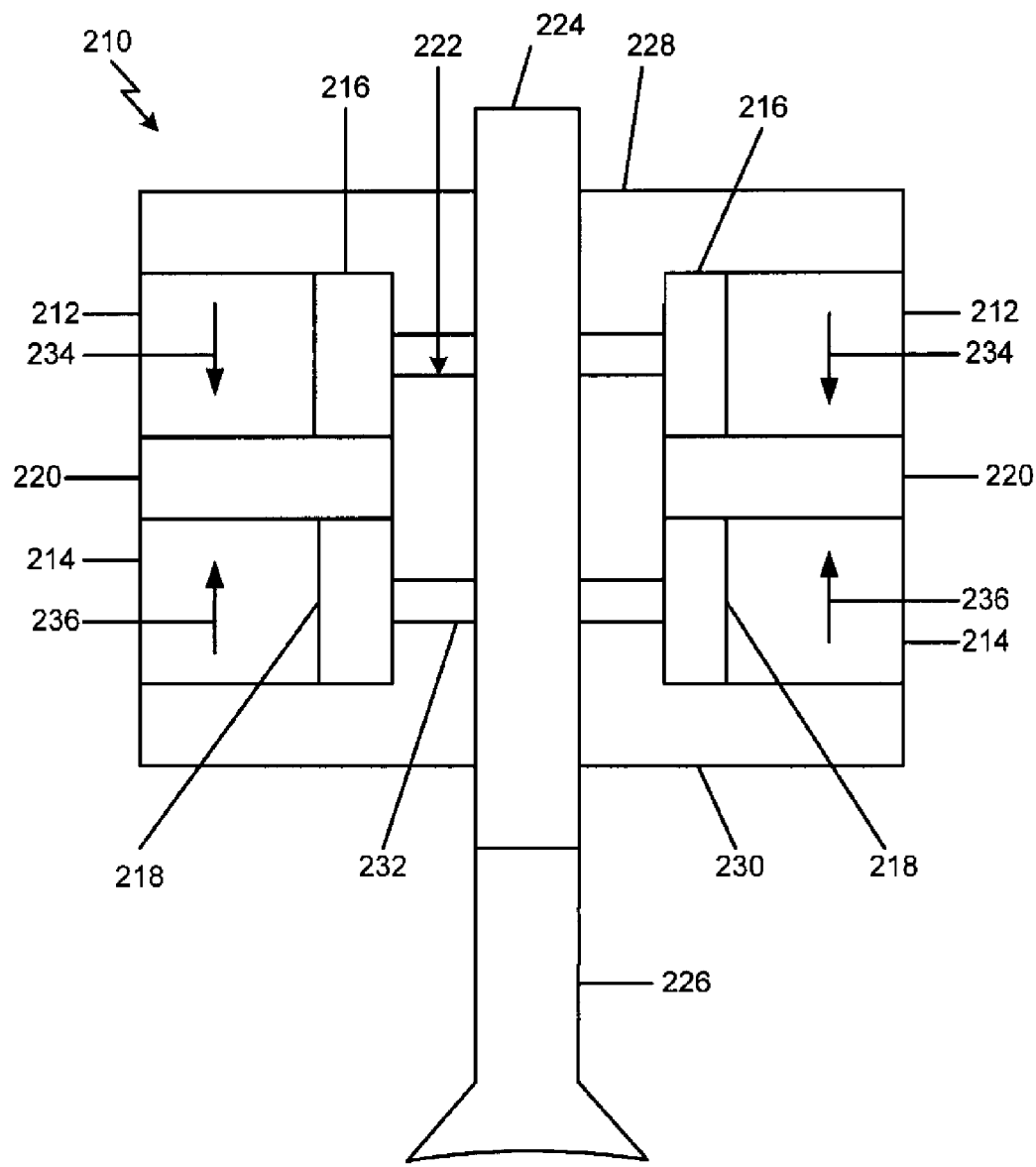
FIG. 4 is a cross-sectional side view of a linear actuator, in accordance with a third exemplary embodiment of the present invention.

FIG. 4 is a cross-sectional side view of a linear actuator 210, in accordance with a third exemplary embodiment of the present invention. The linear actuator 210 is a permanent magnet actuator with a top stationary magnet 212 and a bottom stationary magnet 214. Both the top magnet 212 and the bottom magnet 214 have a substantially cylindrical opening formed therein. A top coil 216 and a bottom coil 218 are at least partially surrounded by the top magnet 212 and the bottom magnet 214, respectively. At least one washer 220 separates the top magnet 212 and the bottom magnet 214 and the top coil 216 and the bottom coil 218. A slug 222 is slidably disposed within the coils 216, 218 and attached to an elongated member 224. The slug 222 is maintained within the coils 216, 218 by a top end cap 228 and a bottom end cap 230. The elongated member 224 is attached to an actuating member 226, such as an engine valve.

The linear actuator 210 is a permanent magnet actuator with stationary magnets 212, 214 and coils 216, 218. Only a slug 222 moves under the influence of the forces controlled by the excitation of the coils 216, 218. The force exerted on the slug 222 is approximately linearly proportional to the applied current and varies roughly linearly over the stroke.

The top magnet 212 and the bottom magnet 214 have opposing vertical magnetization, as shown by the top magnetization 234 and the bottom magnetization 236. The stroke of the slug 222 is limited by the end caps 228, 230. The end caps 228, 230 may be made of a ferromagnetic material to focus the magnetic field. Further, as shown in the third exemplary embodiment, the end caps 228, 230 may extend between the coils 216, 218 to shape the magnetic field. The magnets 212, 214 and excited coils 216, 218 provide the magnetomotive force and the washer 220 and end caps 228, 230 complete the magnetic circuit. The elongated member 224 need not and, preferably, does not influence the magnetic circuit. An air gap 232 exists between the end caps 228, 230 and within the coils 216, 218. A position of the air gap 232 varies with the position of the slug 222. The total air gap 232 is constant, but the effective air gap 232 does vary significantly over the stroke. Because of the nature of the reluctance forces, the effective air gap 232 is measured from the washer 220 to the highest magnetic field end of the linear actuator 210.

As can be seen by comparing FIG. 4 to FIG. 2, the third exemplary embodiment utilizes magnets 212, 214 having greater volume than the magnets 112, 114 in the second exemplary embodiment. The more voluminous magnets 212, 214 allow for greater possible slug 222 acceleration. However, the ability of the linear actuator 210 to conform to the available volume within an engine, or other desired location, may be of greater importance than slug 222 acceleration. Research has suggested the available volume may be more efficiently utilized with a linear actuator 110, 210 and/or permanent magnets 112/212, 114/214 having rectangular prism shapes.

Figure 5:
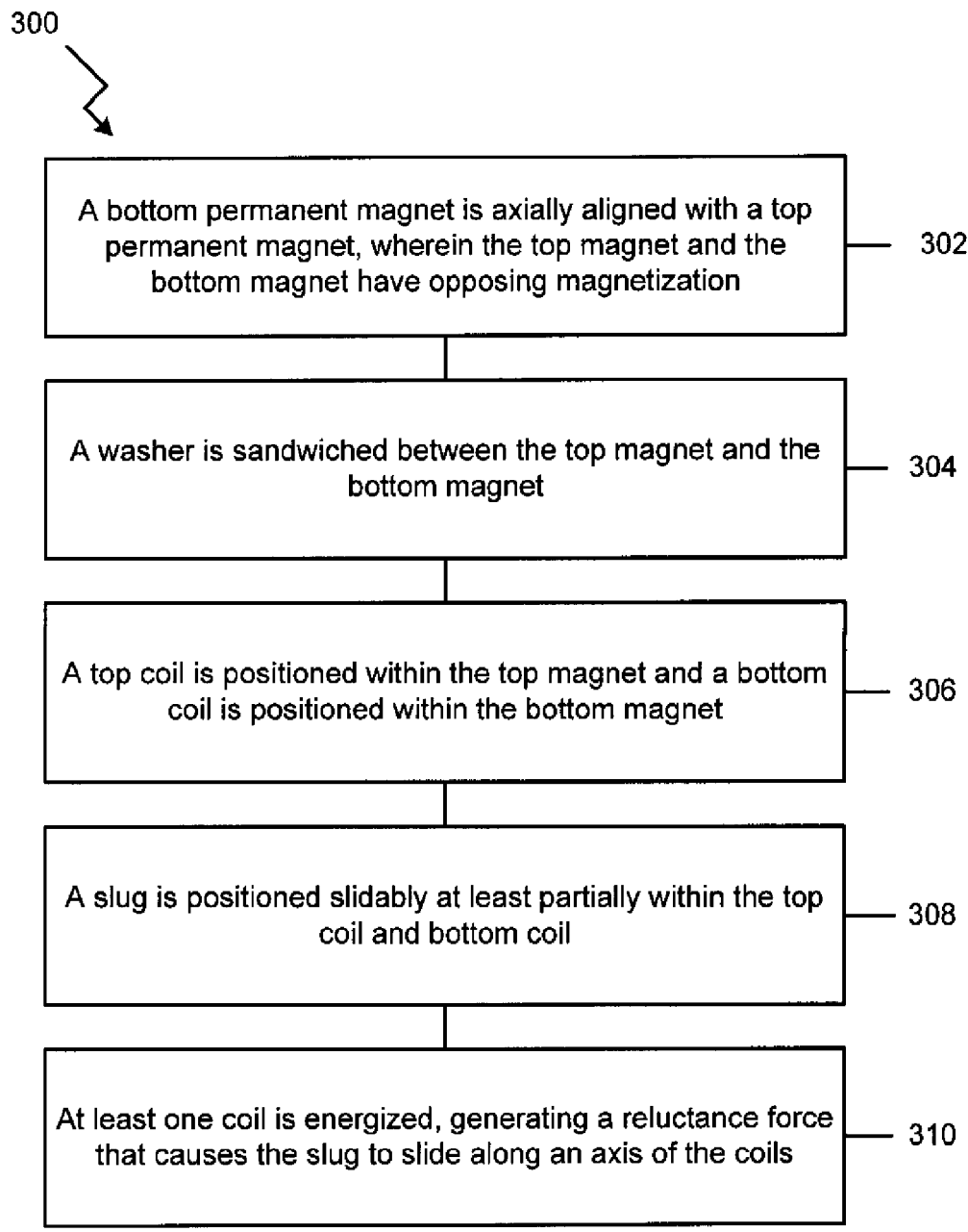
FIG. 5 is a flowchart illustrating a method of providing and utilizing the abovementioned linear actuator shown in FIG. 2, in accordance with the first exemplary embodiment of the invention.

FIG. 5 is a flowchart 300 illustrating a method of providing and utilizing the abovementioned linear actuator 10 shown in FIG. 1, in accordance with the first exemplary embodiment of the invention. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 302, a bottom permanent magnet is axially aligned with a top permanent magnet, wherein the top magnet and the bottom magnet have opposing magnetization. A washer is sandwiched between the top magnet and the bottom magnet (block 304). A top coil is positioned within the top magnet and a bottom coil is positioned within the bottom magnet (block 306). A slug is positioned slidably at least partially within the top coil and bottom coil (block 308). At least one coil is energized, generating a reluctance force that causes the slug to slide along an axis of the coils (block 310).

It should be emphasized that the above-described embodiments of the present invention, particularly, any "preferred" embodiments, are merely possible examples of implementations, basically setting forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A linear actuating device, comprising:
    a top magnet
    a bottom magnet axially aligned with the top magnet, wherein the top magnet and the bottom magnet have opposing magnetization;
    a washer sandwiched between the top magnet and the bottom magnet;
    a top coil positioned within the top magnet;
    a bottom coil positioned within the bottom magnet;
    a slug slidably having an outer diameter, positioned within the top coil and bottom coil;
    a ferromagnetic bottom end cap attached at least proximate to the bottom magnet, the bottom end cap positioned to physically limit a stroke of the slug from moving beyond the bottom coil; and
    an actuating member integral with the slug.

2. The linear actuating device of claim 1, further comprising a ferromagnetic top end cap attached at least proximate to the top magnet.

3. The linear actuating device of claim 1, wherein the slug consists of at least one ferromagnetic material.

4. The linear actuating device of claim 1, wherein the actuating member is an engine valve.

5. The linear actuating device of claim 1, wherein the top magnet and the bottom magnet are substantially rectangular prisms.

6. The linear actuating device of claim 1, wherein the washer consists of at least one ferromagnetic material.

7. The linear actuating device of claim 1, wherein the actuating member further comprises:
    a shaft integral with the slug, the shaft slidable within at least one opening formed in the magnets; and
    a secondary element integral with the shaft and cooperative with a separate device, whereby movement of the secondary element at least partially actuates the separate device.

8. The linear actuating device of claim 1, wherein a magnitude of the magnetization of the top magnet is substantially similar to a magnitude of the magnetization of the bottom magnet.

9. A method of utilizing a linear actuating device, the method comprising the steps of:
    axially aligning a bottom permanent magnet with a top permanent magnet, wherein the top magnet and the bottom magnet have opposing magnetization;
    sandwiching a washer between the top magnet and the bottom magnet;
    positioning a top coil within the top magnet and a bottom coil within the bottom magnet;
    positioning a slug having an outer diameter slidably at least partially within the top coil and bottom coil;
    restraining the slug within the bottom coil by attaching a bottom end cap at least proximate to the bottom magnet, thereby physically limiting the stroke of the slug from moving beyond the bottom coil; and
    energizing at least one coil generating a reluctance force that causes the slug to slide along an axis of the coils.

10. The method of claim 9, further comprising the step of restraining the slug within the bottom coil.

11. The method of claim 10, wherein the step of restraining the slug further comprises attaching a top end cap at least proximate to the top magnet, thereby physically impeding the slug from moving beyond the top coil.

12. The method of claim 11, further comprising the step of focusing the reluctance force with at least one of the end caps.

13. The method of claim 9, wherein the slug consists of at least one ferromagnetic material.

14. The method of claim 9, further comprising actuating an engine valve integral with the slug.

15. The method of claim 9, wherein the top magnet and the bottom magnet are substantially rectangular prisms.

16. The method of claim 9, wherein the washer consists of at least one ferromagnetic material.

17. The method of claim 9, further comprising the steps of:
    sliding a shaft integral with the slug; and
    actuating a secondary element, wherein the secondary element is integral with the shaft and cooperative with a separate device, whereby movement of the secondary element at least partially actuates the separate device.

18. The method of claim 9, wherein a magnitude of the magnetization of the top magnet is substantially similar to a magnitude of the magnetization of the bottom magnet.

19. A linear actuating device, comprising:
    a top magnet
    a bottom magnet axially aligned with the top magnet, wherein the top magnet and the bottom magnet have opposing magnetization;
    a washer sandwiched between the top magnet and the bottom magnet;
    a top coil positioned within the top magnet;
    a bottom coil positioned within the bottom magnet;
    a slug slidably having an outer diameter, positioned within the top coil and bottom coil;
    an elongated member integral with the slug; and
    a ferromagnetic bottom end cap attached at least proximate to the bottom magnet, the bottom end cap positioned to physically limit a stroke of the slug from moving beyond the bottom coil.

* * * * *